Sept. 26, 1967  J. L. WEBB, JR  3,343,764
RETRACTABLE SEAT BELT CONSTRUCTION
Filed Feb. 19, 1965  2 Sheets-Sheet 1
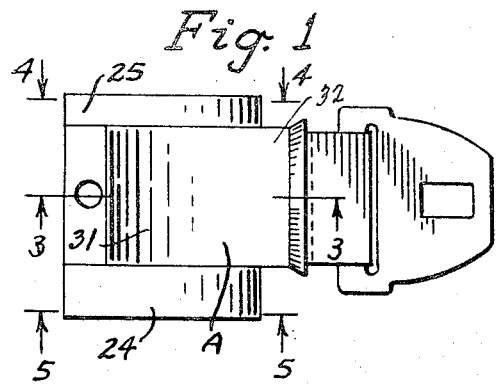
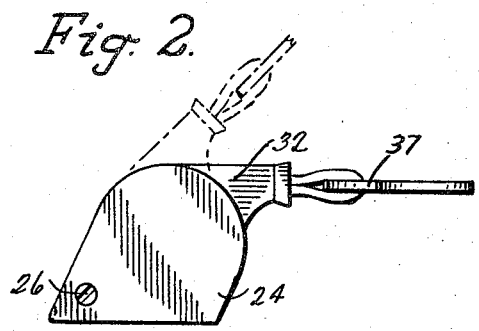
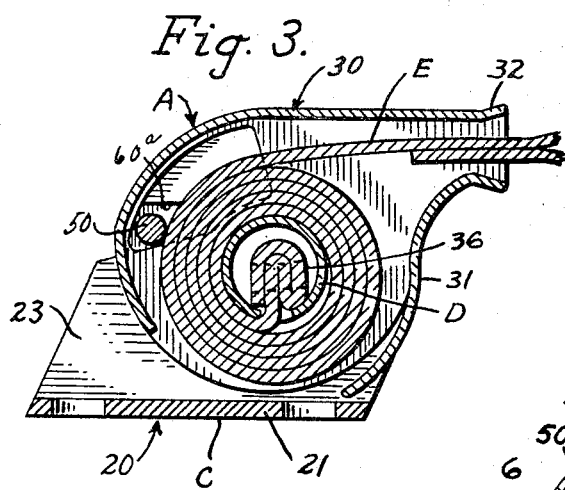
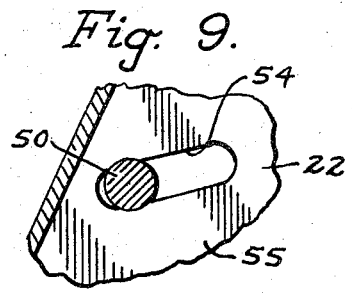
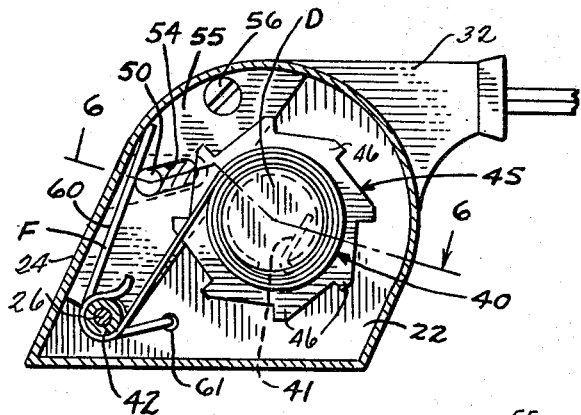
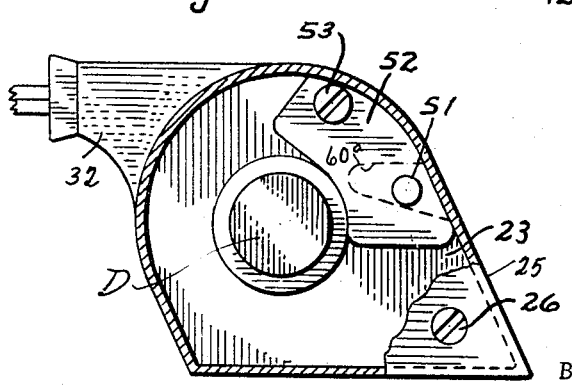
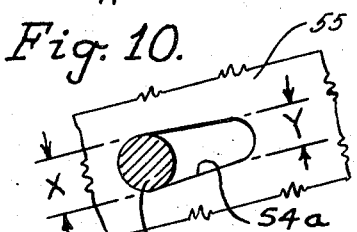
INVENTOR
JAMES L. WEBB, JR.
BY Rommel, Allwine & Rommel
ATTORNEYS

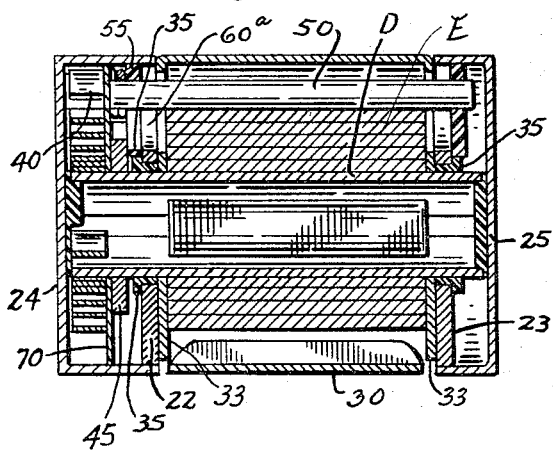
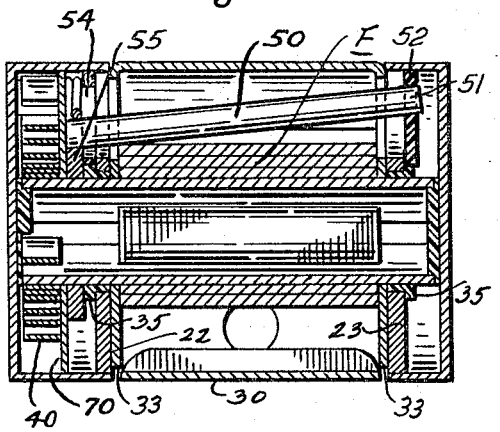
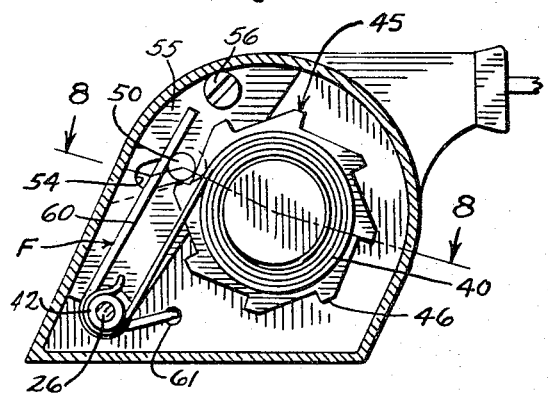
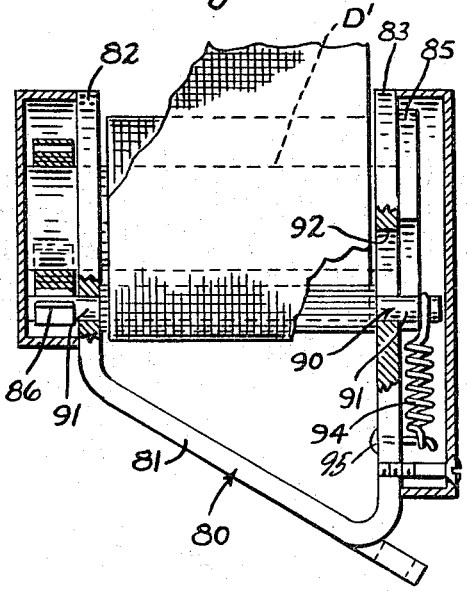
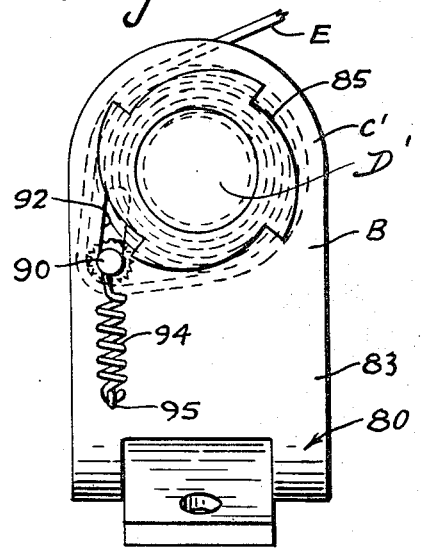

United States Patent Office 3,343,764
Patented Sept. 26, 1967

3,343,764
RETRACTABLE SEAT BELT CONSTRUCTION
James L. Webb, Jr., Beverly Hills, Calif., assignor to Irving Air Chute Company, Inc., Lexington, Ky., a corporation of New York
Filed Feb. 19, 1965, Ser. No. 433,902
2 Claims. (Cl. 242—107.4)

This invention relates to improvements in retractable safety seat belt structures.

The primary object of this invention is the provision of a compact type of retractable seat belt mechanism in which means is provided to normally retract the seat belt. It can be extended for belt coupling purposes and includes an improved time delay mechanism for locking the belt against any extension after the buckle portions of a safety belt assemblage have been coupled together.

It is well known in the art to which this invention relates that retractable seat belts have heretofore been provided which when the torque load upon the seat belt assemblage has been subjected to a predetermined level is locked against any further extension. With such belt mechanism it is necessary to shock pull the belt for a predetermined limited extent in order to lock the belt against further extension. It is therefore a purpose of the present invention to provide a time delay mechanism which will automatically lock the belt against any extension after the belt portions of the safety belt assemblage have been buckled together.

A further object of this invention is the provision of an improved retractable seat belt assemblage having a movable locking member and a seat belt coiled upon a reel for extension therefrom; the locking member at a predetermined retracted coiling of the belt upon the reel engaging and moving the locking member out of a locked position.

A further object of this invention is the provision of a retractable seat belt assemblage including a reel upon which a belt is coiled including a spring to actuate the reel having a biased load of a predetermined amount and an associated locking mechanism including a belt lock member normally spring biased under load greater than the reel spring.

Other objects and advantages of this invention will be apparent during the course of the following detailed description.

In the accompanying drawings, forming a part of this specification, and wherein similar reference characters designate corresponding parts throughout the several views:

FIG. 1 is a plan view of one form of the invention showing a frame encasing assemblage and a seat belt attached thereto.

FIG. 2 is a side elevation of the belt assemblage shown in FIG. 1.

FIGS. 3, 4 and 5 are cross sectional views taken substantially on the respective lines 3—3; 4—4; and 5—5 shown in FIG. 1, and more particularly showing the casing and frame structure of the assemblage; the belt and time controlled locking means.

FIG. 6 is a cross sectional view taken transversely on the line 6—6 of FIG. 5 of the drawings showing the movable locking member or detent in an unlocked relation to permit extension of the belt.

FIG. 7 is a cross sectional view showing the locking member of the assemblage in locked position, preventing any further extension of the belt.

FIG. 8 is a cross sectional view taken substantially on the line 8—8 of FIG. 7; the view more particularly showing the details of FIG. 6 except for the locked position of the locking member.

FIG. 9 is an enlarged fragmentary cross sectional view showing the structure by means of which a lock-out time delay feature is provided.

FIG. 10 is a view similar to FIG. 9, but showing a different form for controlling the time delay of moving the locking member into locking position.

FIG. 11 is a modified form of retractable seat belt assemblage showing a different lock-out structure.

FIG. 12 is a fragmentary cross sectional view of details of the form of invention shown in FIG. 11.

In the drawings, wherein for the purpose of illustration are shown preferred and modified forms of the invention, the letters A and B may generally designate preferred and modified forms of the invention.

The preferred form of invention A preferably comprises a frame structure C having a reel D rotatably supported thereon for coiling the retractable belt E. A time delay locking means F is provided for automatically locking the belt against any extension after it has been extended to belt coupled position.

Referring to the frame structure C, the same comprises a bracket 20 having a base 21 and upstanding rigid standard portions 22 and 23. The standards 22 and 23 are provided with side cup-shaped covers 24 and 25 respectively which are secured by bolts 26 in place upon the respective standards. The covers 24 and 25 house springs and other features of the assemblage at the outer sides of standards 22 and 23.

The frame structure C furthermore includes a belt housing 30 having side walls 33 rotatably mounted on the reel D, as shown in FIGURE 6. It includes a body portion 31 to receive the belt E and a nozzle portion 32 through which the belt extends.

The reel D is in the form of a tubular rotary shaft which bears on the standards 22 and 23 in bushings 35 of synthetic resin, such as "Teflon"; the reel projecting at the outer sides of both bracket standards 22 and 23.

The belt E is of conventional flexible belt webbing and secured at 36 to the reel D, as shown in FIG. 3. The outer end of the belt may have affixed thereto a buckle tongue 37 or the locking buckle part of a buckle mechanism. The nozzle 32 has a small degree of rotational movement to enable the wearer to adjust the belt.

The reel D has a spiral spring 40, one end of which is secured at 41 to the reel D. The opposite end of spring 40 is secured to an anchor pin 42 mounted on standard 22, as shown in FIGS. 5 and 7. Normally the spring 40 is coiled under tension and retracts the belt into the housing 30 in the position shown in FIG. 3.

The time delay lock means F is located between the spring 40 and the adjacent bracket standard 22 as shown in FIGS. 6 and 8. In this space the reel D is provided with a keyed ratchet wheel 45 as shown in FIG. 5 having teeth 46 thereon; the locking edges of the teeth facing clockwise, as shown in FIG. 7; which when engaged by a locking member to be subsequently described prevents rotation of the reel D and further extension of the belt E.

The time delay lock means F includes a lock bar, detent or member 50 which has a pivotal mounting at 51 on a Teflon member 52 secured at 53 on the outer side of the bracket 23. The lock member 50 extends across the chamber of housing 30 at the outer peripheral side of the belt. At its opposite end it is movable along a slot 54 provided in a synthetic resin member 55 attached at 56 to the outer side of standard 22 as shown in FIG. 5. The position of the end of the locking bar 50 operating in the slot 54 is such that the lock bar 50 can move to a neutral position, as shown in FIGS. 5 and 6 or to a locked position with respect to the ratchet wheel 45 as shown in FIGS. 7 and 8.

When the belt E is substantially fully coiled upon the reel D the outermost periphery will move the lock member 50 to an unlocked position, such as shown in FIG. 3.

The standard 22 is cut out at 60ᵃ to permit this degree of movement of the lock member 50 in its slot 54.

The synthetic resin member 55, preferably Teflon, is flexible to the extent that the width of the slot 54 may be slowly expanded as the locking bar 50 moves therealong; it being noted from FIG. 9 that the diameter of the bar 50 is greater than the width dimension of the slot 54. This structural arrangement does not prevent the bar 50 from moving from the unlocked position shown in FIG. 6 to the locked position shown in FIGS. 7 and 8, because under spring force the bar 50 will slowly slide along the slot 54 to a locked position on ratchet wheel 45.

A biasing spring 60 having one end anchored at 61 is tensioned and extended around the pin 42 so as to engage the locking bar 50, as shown in FIG. 5. It normally urges the locking bar 50 into locking direction with the ratchet wheel 45.

While the bar 50, as shown in FIG. 9, may be of greater width than the slot 54, as shown in FIG. 7, it may be of the same width provided there is sufficient frictional resistance along the side edges of the slot 54 to delay its movement into locking position under influence of the spring 60.

As shown in FIG. 10, I may provide a slot 54ᵃ the lower end of which is of the same diameter as the locking pin 50. The slot 54ᵃ may decrease in width to a location at its opposite end; the dimension "X" being greater than the dimension "Y." This taper insures that the locking bar 50 will be delayed in riding from the large end of the slot 54ᵃ to the smaller end thereof under influence of the spring 60.

A partition member 70 of synthetic resin may be located between the ratchet wheel 45 and the spring 40.

In the operation of the improved retractable seat belt structure above described, assuming the belt is in retracted position as shown in FIG. 3, the operator will extend the belt and connect the buckle parts with the belt in normal tension around the waist of the wearer. Under these circumstances the belt extends from the fully coiled position shown in FIG. 6 to the partially coiled position shown in FIG. 8. Uncoiling of the belt will permit the spring 60 to come into action and slowly move the lock bar from the position shown in FIG. 5 to the position shown in FIG. 8, where it is locked with one of the teeth of the ratchet wheel 45. The time delay in effecting this locking action may consist of a few seconds to 30 or more seconds, depending upon the resistance offered to movement of the locking bar 50 by the material in which it is engaged. The locking action will automatically take place without intervention on the part of the operator in a matter of seconds after the belt buckle parts have been snapped into engage position. This then locks the belt parts against any further extensions, so that in the event of a crash the belt will not extend in any degree.

When the belt buckle is opened, after use, the spring 40 which is considerably stronger than the spring 60 rotates the wheel 45 and cams the bar 50 from the locked position shown in FIG. 7 to the unlocked position shown in FIG. 5. As the belt coils upon the reel it will also move the lock bar 50 to its maximum unlocked position shown in FIG. 3.

The material Teflon is a flexible tetrafluoroethylene resin.

In the form of invention B, shown in FIGS. 11 and 12, the frame structure C' includes a bracket 80 having an attaching base 81 and standard portions 82 and 83. A reel D' is rotatably supported by these standards 82 and 83. A reel D' is provided with a ratchet wheel 85 of the same type shown for the preferred embodiment of this invention. A spiral spring 86 corresponding to the spiral spring 40 of the preferred form of invention A is provided to normally coil the belt on the reel.

The lock-out mechanism for the form of invention B preferably comprises a lock bar or roller 90 pivotally and rotatably mounted at end 91. The other end 91 is extended through a slot 92 provided in the standard 83 sloped so the lock bar 90 will move in the direction of the ratchet wheel to engage the teeth of the ratchet wheel and stop unwinding action of the belt.

A spring 94 is anchored at one end on the standard 83 at 95 and at its other end is secured to the bar 90 for normally withdrawing the lock bar to the down position in slot 92, as shown in FIG. 11. It will be noted from FIG. 11 that the last strand of the belt E' is trained about a ribbed roller portion of the lock bar 90, as shown in FIGS. 11 and 12.

Normally spring 86 has a 4-pound pull, and the spring 94 requires a 7½-pound pull to extend the same. Under the circumstances described, it is obvious that the belt E' may be extended under normal tension for the purpose of attachment upon a wearer. However, under crash conditions or when a severe pull is placed up on the belt, it will overcome the 7½-pound tension of the spring 94 and move the bar 90 into locking engagement with the teeth of the ratchet wheel 85. This prevents any further extension of the belt.

When the belt E is unbuckled the tension on the spring 94 will move the lock bar out of engagement with the ratchet wheel 85 and the coil spring 86 will coil the belt upon the reel.

Various changes in the size, shape and arrangement of parts may be made to the forms of invention herein shown and described without departing from the spirit of the invention or scope of the claims.

I claim:

1. In a retractable seat belt construction the combination of a frame, a rotatable reel mounted on said frame, a belt for coiling on said reel, means on the frame attached to said reel to normally coil the belt in retracted relation on said reel, a locking member movably mounted on said frame, means attached to the reel with which the locking member is engageable to lock the reel aagainst movement in a belt extending relation, spring means normally urging the locking member into locking relation with the reel, and means guiding the position of the locking member in its movements into and out of locking relation with respect to said reel comprising a synthetic resin flexible member having a slot therein within which the locking member is slidable and which is flexible and sufficiently rigid to enable the locking member under action of its spring means to move with a delayed action along the slot to a locked position.

2. A retractable seat belt as described in claim 1 in which the locking member comprises an elongated bar having a slight pivotal action on the frame at one end and an arcuate movement in said slot at the other end.

References Cited

UNITED STATES PATENTS

| | | | |
|---|---|---|---|
| 1,027,655 | 5/1912 | Johnson | 242—100 |
| 3,100,669 | 8/1963 | Monroe | 297—388 |
| 3,193,327 | 7/1965 | Roe | 297—388 |
| 3,286,946 | 11/1966 | Board et al. | 297—388 X |

FRANK J. COHEN, *Primary Examiner.*

W. S. BURDEN, *Assistant Examiner.*